E. M. Stigale,
Floral Bracket.
No. 112,748.  Patented Mar. 14, 1871.
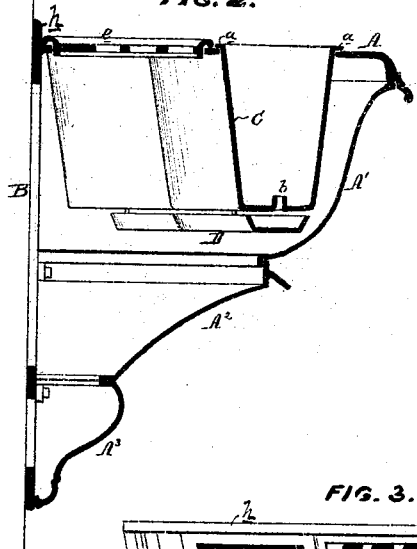
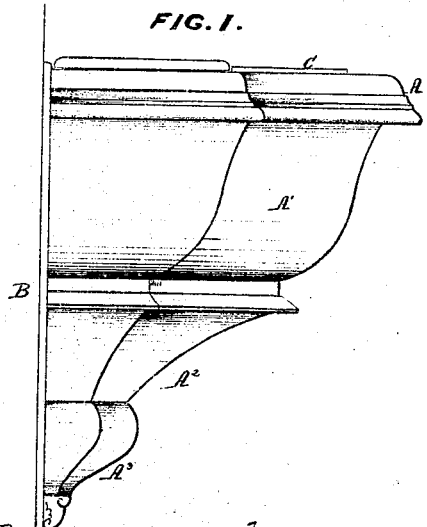
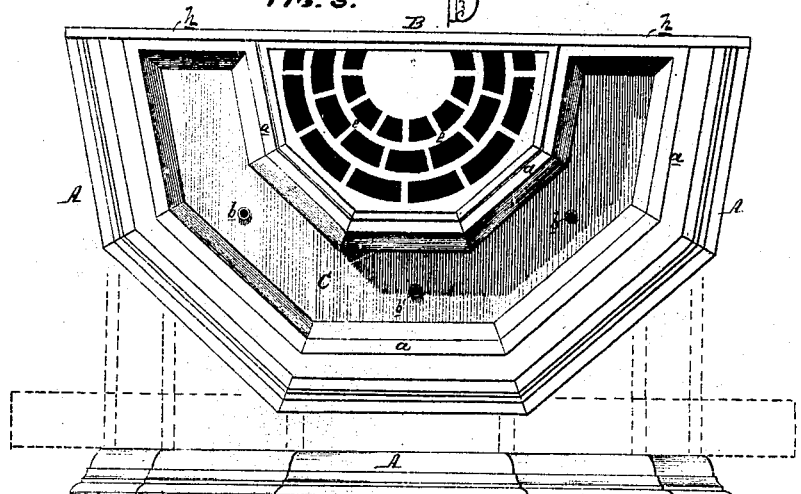
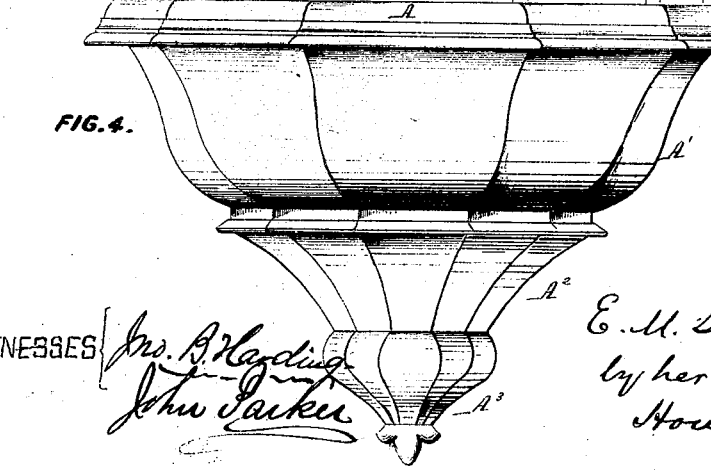
WITNESSES  
Jno. B. Harding  
John Parker  
E. M. Stigale  
by her Atty  
Howson and Co.

United States Patent Office.

ELIZABETH MARY STIGALE, OF PHILADELPHIA, PENNSYLVANIA.

Letters Patent No. 112,748, dated March 14, 1871.

IMPROVEMENT IN FLORAL-BRACKETS.

The Schedule referred to in these Letters Patent and making part of the same.

I, ELIZABETH MARY STIGALE, of Philadelphia, county of Philadelphia, State of Pennsylvania, have invented a Floral-Bracket or Frame for Windows, &c., of which the following is a specification.

Nature and Object of the Invention.

My invention consists of a bracket, arranged for attachment to a window-frame, wall, or other fixed object, and having a trough or recess for the reception of earth in which to cultivate creepers and other plants; and My invention also consists of certain peculiarities in the construction of the bracket, and of the combination with the latter of a glazed frame for the protection of the plants.

Description of the Accompanying Drawing.

Figure 1 is a side view of my floral-bracket or frame for windows, &c.;

Figure 2, a sectional view of the same;

Figure 3, a plan view; and

Figure 4, a front view.

General Description.

The bracket, as represented in the drawing, is made of cast-iron, and consists of horizontal sections A, $A^1$, $A^2$, and $A^3$, bolted or otherwise secured together and to a back piece, B, the latter being arranged in any suitable manner for attachment to a wall, window-frame, or other fixed object.

The upper section or top plate A of the hollow bracket has a recess, corresponding in shape to the exterior of the latter, for the reception of a deep trough or basin, C, which tapers slightly toward the bottom, as best observed in fig. 2, and is supported by flanges $a\ a$ at its upper end, which rest upon the top plate A.

The trough or basin when thus arranged within the bracket can, at any time, be lifted out of the same, either for the purpose of obtaining access to the interior of the bracket or for filling the said trough with earth or mold in which to cultivate creepers and other plants.

In order to insure proper drainage of the trough or basin its bottom is perforated at one or more points, the perforations being preferably formed in projections $b$, raised slightly above the bottom of the trough, as shown in fig. 2, so that all the moisture may not be drawn off from the said trough.

The drippings from the perforated bottom of the trough are caught in a shallow vessel, D, suspended in any suitable manner within the bracket; and in order to prevent injury to the wall or other object to which the bracket is attached by the overflowing of the said vessel, I propose to furnish the latter with an overflow-tube, projecting through the front or side of the bracket.

The back plate B projects slightly above the top of the bracket, as plainly shown in the drawing, so as to form a projecting ledge, $h$, which serves as a dasher, to prevent the splashing of muddy water upon the window-sill or other object to which the bracket is attached, when the plants in the trough are watered.

The portion of the top of the bracket between the trough and the back plate B is, in the present instance, occupied by a permanent or detachable plate, $e$, upon which can be placed a bird-cage or other object.

This plate can, however, be dispensed with, and the trough be made of such a shape as to occupy the whole interior of the bracket.

Although I prefer that the bracket should be constructed of cast-iron, as above described, it can be made of sheet metal, pottery-ware, wood, or other suitable material, and either in sections or in one piece, and of any desired size or shape.

The trough, also, instead of being made detachable, as above described, can be formed in and with the bracket, or be merely a recessed portion of the latter.

As first described the bracket is intended as an ornamental attachment for windows, it being made of the same width as the latter, and arranged for attachment to the lower portion of the frame, or to the wall, either inside or outside of the window.

When arranged outside of a window, I propose, in some cases, to combine with the bracket a permanent or detachable glazed frame, to entirely inclose the window, as indicated by dotted lines in fig. 4.

The bracket and glazed frame together will have the appearance of an ornamental box-window, and the glazed frame will serve to protect the plants cultivated in the trough or recess of the bracket, and to retain the warmth of the inner apartment about the said plants.

Claims.

1. A bracket, arranged for attachment to a wall, window-frame, or other object, and having a recess or trough for the reception of earth, all substantially as described.

2. The said bracket, when combined with a glazed frame and adapted to a window, as set forth.

3. The said bracket, when provided with a detachable trough or basin, C, suspended within the bracket by flanges $a\ a$, substantially in the manner described.

4. The short tubes or perforated projections $b$ in the bottom of the said trough or basin, for the purpose specified.

5. The combination of the said trough with a drip-receiver, D, arranged beneath and within the hollow bracket, as described.

6. The projecting ledge or dasher $h$, at the back of the bracket, for the purpose specified.

In testimony whereof I have signed my name to this specification in the presence of two subscribing witnesses.

ELIZABETH MARY STIGALE.

Witnesses:
JOHN B. MAKINS,
MAURICE MURPHY.